United States Patent
Li

(10) Patent No.: US 11,942,046 B1
(45) Date of Patent: Mar. 26, 2024

(54) DISPLAY MODULE, INTEGRATED CIRCUIT AND DISPLAY APPARATUS

(71) Applicant: Xiamen Tianma Display Technology Co., Ltd., Xiamen (CN)

(72) Inventor: Chengxu Li, Xiamen (CN)

(73) Assignee: XIAMEN TIANMA DISPLAY TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 18/136,887

(22) Filed: Apr. 20, 2023

(30) Foreign Application Priority Data

Jan. 16, 2023 (CN) .......................... 202310074868.5

(51) Int. Cl.
*G09G 3/3291* (2016.01)

(52) U.S. Cl.
CPC ..... *G09G 3/3291* (2013.01); *G09G 2330/021* (2013.01)

(58) Field of Classification Search
CPC .......... G09G 2330/021; G09G 3/3291; G09G 3/3258
See application file for complete search history.

(56) References Cited

U.S. PATENT DOCUMENTS

| 11,158,690 | B1* | 10/2021 | Choi | H01L 27/1218 |
| 2003/0038904 | A1* | 2/2003 | Kaneko | G02F 1/133512 349/110 |
| 2005/0248512 | A1* | 11/2005 | Vossen | G09G 3/3216 345/76 |
| 2014/0232705 | A1* | 8/2014 | Fujii | G09G 3/3291 345/204 |
| 2015/0364116 | A1* | 12/2015 | Kong | G09G 3/3233 345/82 |
| 2016/0203758 | A1* | 7/2016 | Tsuge | G09G 3/325 345/76 |
| 2022/0287183 | A1* | 9/2022 | Chen | H05K 1/0218 |

FOREIGN PATENT DOCUMENTS

| CN | 111223453 A | 6/2020 |
| CN | 111192556 B | 11/2021 |
| CN | 113687546 A | 11/2021 |
| CN | 113852147 A | 12/2021 |
| CN | 114863856 A | 8/2022 |
| KR | 20210146542 A | 12/2021 |

* cited by examiner

*Primary Examiner* — Abbas I Abdulselam
(74) *Attorney, Agent, or Firm* — East IP P.C.

(57) ABSTRACT

The present application discloses a display module, an integrated circuit and a display apparatus. The display module includes: a display panel including data lines and power lines; and a first capacitor electrically connected to one or more of the power lines, wherein the first capacitor is configured to at least partially offset a variation of a power voltage on each of the one or more power lines caused by a data voltage on a corresponding one of the data lines.

15 Claims, 11 Drawing Sheets

DISPLAY MODULE, INTEGRATED CIRCUIT AND DISPLAY APPARATUS

CROSS-REFERENCE TO RELATED APPLICATIONS

The present application is based upon and claims priority to Chinese patent application No. 202310074868.5 filed on Jan. 16, 2023, the content of which is incorporated herein by reference in its entirety.

TECHNICAL FIELD

The present application relates to the field of display technologies, and particularly to a display module, an integrated circuit and a display apparatus.

BACKGROUND

With the continuous development of display technologies, users have more and more requirements on display effects. A display panel often includes data lines and power lines. However, there may be a coupling capacitance between a data line and a corresponding power line. When a data voltage on the data line jumps, a power voltage on the corresponding power line fluctuates synchronously as affected by the coupling capacitance, which results in signal crosstalk and affects the display effect.

SUMMARY

Embodiments of the present application provide a display module, an integrated circuit and a display apparatus, which are beneficial to improve the stability of power voltage, so as to improve the display effect.

One aspect of the present application provides a display module, including: a display panel including data lines and power lines; and a first capacitor electrically connected to one or more of the power lines, wherein the first capacitor is configured to at least partially offset a variation of a power voltage on each of the one of more power lines caused by a data voltage on a corresponding one of the data lines.

Based on the same inventive concept, another aspect of the present application provides an integrated circuit configured to provide a signal for a display panel including data lines and power lines, wherein the integrated circuit includes a first capacitor electrically connected to one or more of the power lines, and the first capacitor is configured to at least partially offset a variation of a power voltage on each of the one of more power lines caused by a data voltage on a corresponding one of the data lines.

Based on the same inventive concept, another aspect of the present application provides a display apparatus including the display module according to the embodiment of the first aspect.

BRIEF DESCRIPTION OF THE DRAWINGS

Other features, objects and advantages of the present application will become more apparent from the following detailed description of the non-limiting embodiments with reference to the drawings, in which the same or similar reference signs refer to the same or similar features, and the drawings are not drawn according to actual scales.

DETAILED DESCRIPTION

Figure 1:
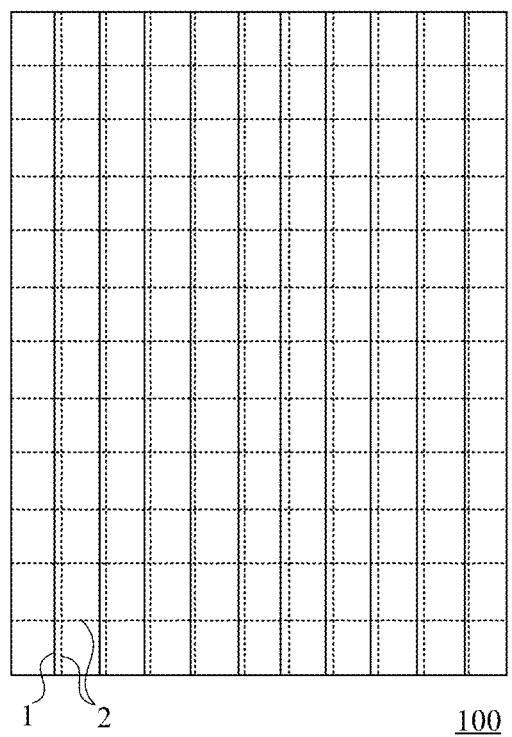
FIG. 1 shows a schematic structural diagram of a display panel in the related art.

Features and exemplary embodiments of various aspects of the present application will be described in detail below. In order to make the objects, technical solutions and advantages of the present application clearer, the present application is further described in details below with reference to the drawings and specific embodiments. It should be understood that the specific embodiments described herein are merely configured to illustrate the present application, rather than to limit the present application. For those skilled in the art, the present application can be implemented without some of these specific details. The following description of the embodiments is only for providing a better understanding of the present application by illustrating examples of the present application.

It should be noted that relational terms such as "first" and "second" are used herein only for distinguishing one entity or operation from another entity or operation, and do not necessarily require or imply any such actual relationship or order between these entities or operations. Moreover, the terms "comprising", "including" or any other variation thereof are intended to encompass a non-exclusive inclusion, such that a process, a method, an article or a device including a series of elements not only includes these elements, but also includes other elements not explicitly listed or elements inherent to the process, the method, the article or the device. Without further limitation, an element preceded by "comprising . . . " and "including . . . " does not exclude the presence of additional similar elements in a process, a method, an article or a device including the element.

It should be noted that when a structure of a component is described, a layer/region being referred to as "above" or "over" another layer/region may mean that the layer/region is directly above or over the other layer/region, or that there may be other layer(s)/region(s) between the layer/region and the other layer/region. Moreover, if the component is turned over, the layer/region will be "under" or "below" the other layer/region.

It should be understood that the term "and/or" as used herein only refers to an association relationship for describing associated objects, which may indicate three possible relationships. For example, "A and/or B" may indicate: A alone, both A and B, and B alone. In addition, the character "/" herein generally represents an "or" relationship between the associated objects before and after the character.

In the embodiments of the present application, the term "electrically connected" may indicate that two components are directly electrically connected, or that the two components are electrically connected via one or more other components.

It will be apparent to those skilled in the art that various modifications and variations can be made to the present application without departing from the gist or scope of the present application. Accordingly, the present application is intended to encompass the modifications and variations to the present application that fall within the scope of the appended claims (the claimed technical solutions) and equivalents thereof. It should be noted that the implementations provided by the embodiments of the present application may be combined with one another if there is no conflict.

Before illustrating the technical solutions provided by embodiments of the present application, the present application describes the problems in the related art firstly, to facilitate understanding of the embodiments of the present application.

As shown in FIG. 1, data lines 1 and power lines 2 may be provided in a display panel 100, the data lines 1 may extend along a longitudinal direction, and the power lines 2 may include lines extending laterally and lines extending longitudinally that constitute a grid of power lines 2. Each data line 1 is configured to transmit a data voltage Vdata, and a voltage value of the data voltage Vdata is related to a gray scale image to be displayed. For example, the greater a gray scale value of the gray scale image to be displayed is, the less the voltage value of the data voltage Vdata is, and the less the gray scale value of the gray scale image to be displayed is, the greater the voltage value of the data voltage Vdata is. Each power line 2 is configured to transmit a fixed power voltage PVDD. For example, the power line 2 may be configured to transmit a positive power voltage. In FIG. 1, the data lines 1 are shown in solid lines and the power lines 2 are shown in dashed lines, in order to distinguish the data lines from the power lines clearly.

Figure 2:
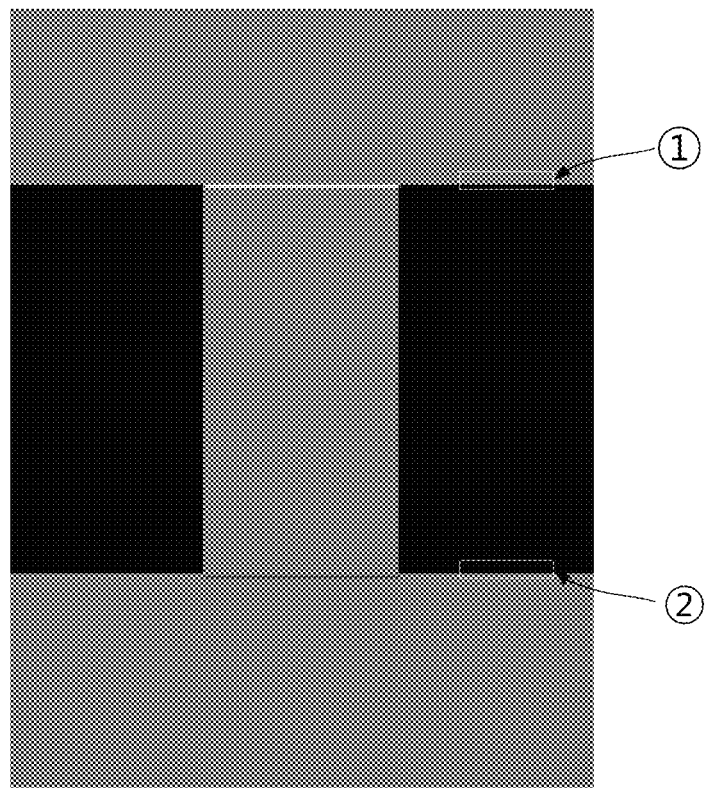
FIG. 2 shows a schematic diagram of a display scene of a display panel.
Figure 3:
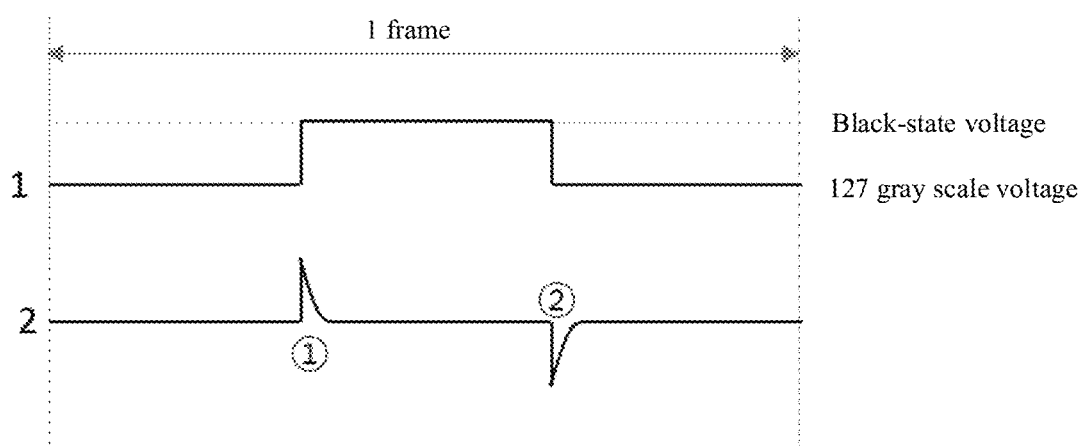
FIG. 3 shows a voltage variation diagram of a display panel.

There may be a coupling capacitance between a data line 1 and a power line 2. When a data voltage Vdata of the data line 1 jumps, a power voltage of the power line 2 fluctuates synchronously as affected by the coupling capacitance. Particularly, as shown in FIG. 2, an example is given in which a part of an area of a display panel displays a black image, and another part of the area displays a 127 gray scale image. As shown in FIG. 3, at a position ①, the data voltage Vdata on a data line 1 jumps from a voltage corresponding to the 127 gray scale to a black-state voltage, i.e., the data voltage Vdata jumps upward, so that the power voltage of a power line 2 at the position ① also jumps upward due to a coupling effect, leading to a bright line at the position ①. At a position ②, the data voltage Vdata on a data line 1 jumps from the black-state voltage to the voltage corresponding to the 127 gray scale, i.e., the data voltage Vdata jumps downward, so that the power voltage of a power line 2 at the position ② also jumps downward due to the coupling effect, leading to a dark line at the position ②. Therefore, the bright line or dark line visible to naked eyes may appear at an intersection of a dark state image and a bright state image, which may be referred to as a phenomenon of horizontal line crosstalk. This phenomenon would affect the display effect and thus affect the user experience.

In order to solve at least the above problem, embodiments of the present application provide a display module, an integrated circuit and a display apparatus. Various embodiments of the display module, the integrated circuit and the display apparatus will be described below with reference to the accompanying drawings.

Figure 4:
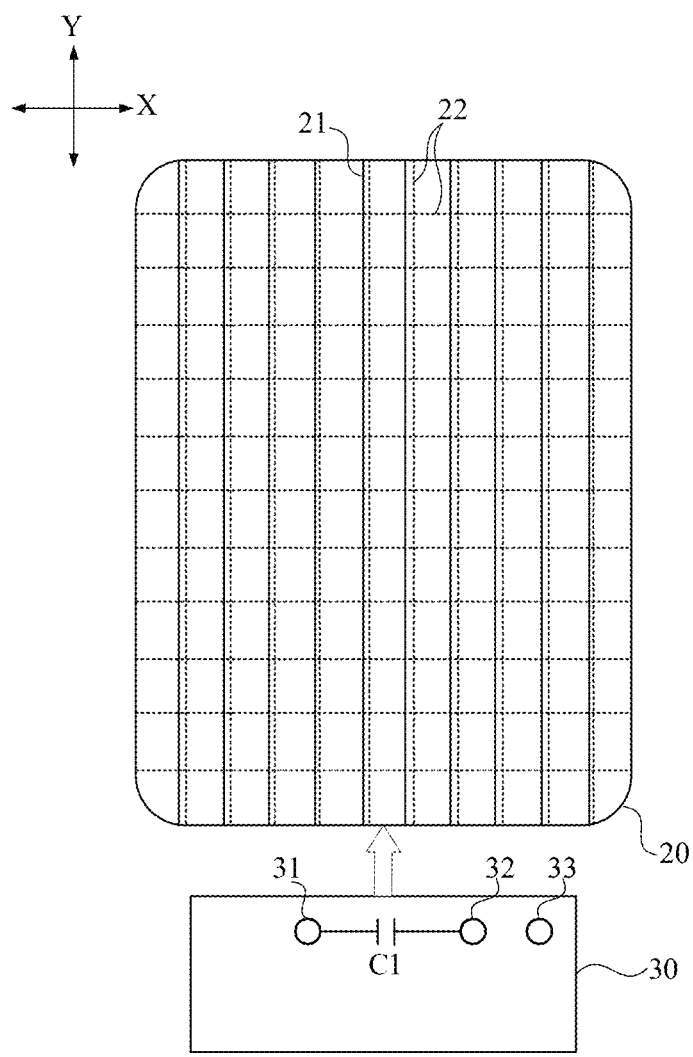
FIG. 4 shows a schematic structural diagram of a display module provided by an embodiment of the present application.

As shown in FIG. 4, a display module 200 may include a display panel 20 and a first capacitor C1. The display panel 20 may be an organic light emitting diode (OLED) display panel or another type of display panel.

The display panel 20 includes data lines 21 and power lines 22. The data lines 21 and the power lines 22 are electrically connected to pixel circuits (not shown) of the display panel 20. A data line 21 is configured to transmit a data voltage Vdata to a pixel circuit, and a power lines 22 is configured to transmit a power voltage PVDD to a pixel circuit. The power line 22 may transmit a positive power voltage PVDD.

The data lines 21 may extend along a column direction Y, and a plurality of data lines 21 may be arranged along a row direction X.

In order to reduce a voltage drop, the power lines 22 may be arranged as a grid. Particularly, a part of the power lines 22 may extend along the row direction X, the other part of the power lines 22 may extend along the column direction Y, and the part of the power lines 22 extending along the row direction X and the part of the power lines 22 extending along the column direction Y are connected to each other.

Similarly, the data lines 21 are shown in solid lines and the power lines 22 are shown in dashed lines in FIG. 4, in order to distinguish the data lines from the power lines clearly.

The first capacitor C1 may be electrically connected to one or more of the power lines 22, and a variation of the power voltage on each of the one of more power lines 22 caused by the first capacitor C1 may at least partially offset a variation of the power voltage on the power line 22 caused by the data voltage on a corresponding one of the data lines 21.

As described above, there may be a coupling capacitance between a data line 21 and a power line 22, so that when a data voltage on the data line 21 jumps, a power voltage of the power line 22 fluctuates synchronously as affected by the coupling capacitance. For example, in a situation where the data voltage on the data line 21 jumps upward, the power voltage of the power lines 22 may also jump upward due to the influence of the coupling capacitance; and, in a situation where the data voltage on the data line 21 jumps downward, the power voltage of the power line 22 may also jump downward due to the influence of the coupling capacitance. It may be understood that jumping upward means a voltage changing from low to high, and jumping downward means a voltage changing from high to low.

Exemplarily, one terminal of the first capacitor C1 may be electrically connected to the one or more power lines 22, the other terminal of the first capacitor C1 may be configured to receive a jump voltage, and a jump direction of the jump voltage received by the other terminal of the first capacitor C1 is opposite to a jump direction of the data voltage. For example, when the data voltage on the data line 21 jumps upward, the jump voltage received by the other terminal of the first capacitor C1 may jump downward; and when the data voltage on the data line 21 jumps downward, the jump voltage received by the other terminal of the first capacitor C1 may jump upward.

In the embodiment of the present application, the first capacitor C1 is provided, which causes the variation of the power voltage on each of the power lines 22 to at least partially offset the variation of the power voltage on the power line 22 caused by the data voltage on the corresponding one of the data lines 21, for example, a jump direction of the power voltage on the power line 22 caused by the first capacitor C1 may be opposite to a jump direction of the power voltage on the power line 22 caused by the data voltage on the corresponding one of the data lines 21, so that it is beneficial to improve the stability of the power voltage on the power lines 22, and thereby mitigate a problem that a bright line or a dark line appears at an intersection of a dark state image and a bright state image of the display panel, so as to improve the display effect and the user experience.

Optionally, the first capacitor C1 may be provided in a display area of the display panel 20, for example, the first capacitor C1 may be provided adjacent to a power line 22. There may be a plurality of first capacitors C1, for example, each of the power lines 22 may be electrically connected to one first capacitor C1.

In some embodiments, as shown in FIG. 4, the display module 200 may further include an integrated circuit 30. The integrated circuit 30 may include a power terminal 31 that is electrically connected to the power lines 22 on the display panel 20. The power terminal 31 may be configured to provide the power voltage PVDD, and the power voltage PVDD provided by the power terminal 31 may be transmitted to the power lines 22, and then may be transmitted via the power lines 22 to the pixel circuits (not shown) on the display panel. The power terminal 31 may be understood as an output terminal of the power voltage PVDD.

As described above, the power lines 22 may be arranged as a grid, that is, a plurality of power lines 22 are connected to one another, and the plurality of power lines 22 are electrically connected to the same power terminal 31. In a situation where a voltage drop is omitted, a power voltage on the power terminal 31 may be considered to be the same as the power voltage on each of the power lines 22, so that a variation of the power voltage on the power terminal 31 is the same as the variation of the power voltage on each of the power lines 22. That is, when the power voltage of each of the power lines 22 jumps upward due to the jump of the data voltage, the power voltage of the power terminal 31 also jumps upward; and when the power voltage of each of the one of more power lines 22 jumps downward due to the jump of the data voltage, a power voltage of the power terminal 31 also jumps downward.

One terminal of the first capacitor C1 may be connected to the power terminal 31, and since the power terminal 31 is electrically connected to the power lines 22 on the display panel 20, the terminal of the first capacitor C1 is electrically connected to the power lines 22 via the power terminal 31. The other terminal of the first capacitor C1 may receive the jump voltage, and due to the coupling effect of the first capacitor C1, the power voltage of the power terminal 31 jumps as a voltage of the other terminal of the first capacitor C1 jumps. Since the power voltage of the power terminal 31 will be transmitted to the power lines 22, the jump of the power voltage of the power terminal 31 is equivalent to the jump of the power voltage of each of the power lines 22; and in a situation where the terminal of the first capacitor C1 is electrically connected to the power lines 22 via the power terminal 31, the first capacitor C1 may change the power voltage on each of the power lines 22. In addition, by connecting the terminal of the first capacitor C1 to the power terminal 31, the first capacitor C1 may be electrically connected to each of the plurality of power lines 22, and therefore, only one first capacitor C1 needs to be provided, and it is not necessary to provide the first capacitor C1 in the display area of the display panel 20. As such, it is beneficial to reduce costs and improve the resolution of the display panel.

In some embodiments, as shown in FIG. 4, the integrated circuit 30 may further include an analog voltage terminal 32. The integrated circuit 30 generates, based on an analog voltage AVDD of the analog voltage terminal 32, the data voltage Vdata required by the display panel 20 for display. The integrated circuit 30 may further include a data voltage terminal 33 electrically connected to the data lines 21 of the display panel 20. There may be a plurality of data voltage terminals 33. The data voltage Vdata generated by the integrated circuit 30 may be transmitted to the data lines 21 of the display panel 20 via the data voltage terminal(s) 33, and then may be transmitted to the pixel circuits of the display panel 20 via the data lines 21.

Through research, the inventor has found that the analog voltage AVDD of the analog voltage terminal 32 turns into a overcompensated state and cannot remain stable when data voltages on the plurality of data lines 21 change in the same way, that is, ripples may be generated in the analog voltage AVDD of the analog voltage terminal 32, when the data voltages on the plurality of data lines 21 change. Through research, the inventor has found that the analogue voltage AVDD of the analogue voltage terminal 32 jumps downward when the data voltages on the plurality of data lines 21 all jump upward; and the analog voltage AVDD of the analog voltage terminal 32 jumps upward when the data voltages on the plurality of data lines 21 all jump downward. Therefore, a jump direction of the analog voltage AVDD of the analog voltage terminal 32 is opposite to a jump direction of the data voltages on the plurality of data lines 21.

Figure 5:
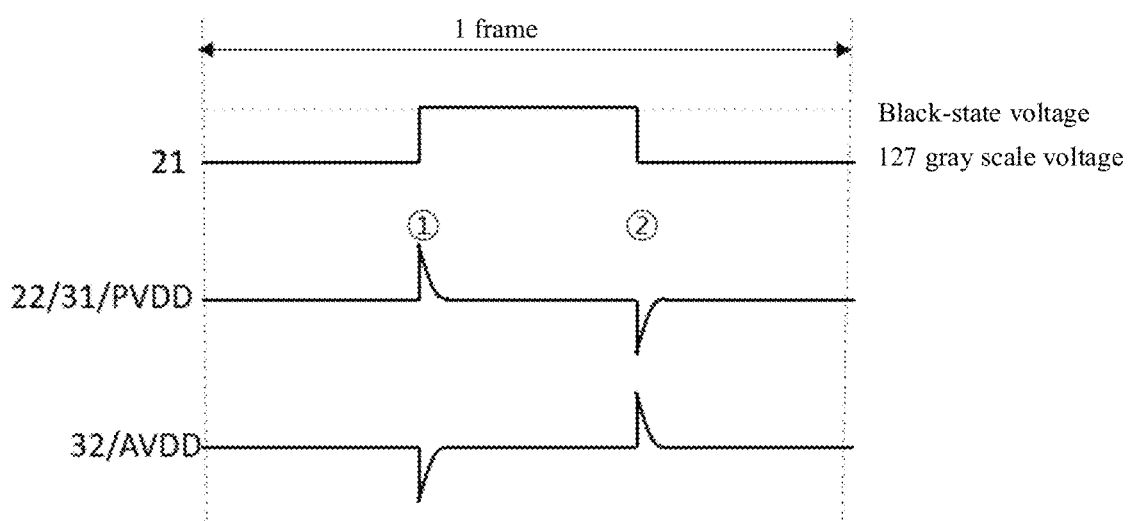
FIG. 5 shows another voltage variation diagram of a display panel.

Particularly, it is taken as an example that a display scene of the display panel is the display scene shown in FIG. 2. As shown in FIG. 5, at a position ①, the data voltage Vdata on a data line 21 jumps from a voltage corresponding to the 127 gray scale to a black-state voltage, and the data voltage Vdata jumps upward, so that the power voltage of a power line 22 at the position ① also jumps upward due to the coupling effect, while the jump direction of the analog voltage AVDD of the analog voltage terminal 32 is opposite to the jump direction of the data voltage, and therefore, at the position ①, the analog voltage AVDD of the analog voltage terminal 32 jumps down. At a position ②, the data voltage Vdata on the data line 21 jumps from the voltage corresponding to the 127 gray scale to the black-state voltage, and the data voltage Vdata jumps downward, so that the power voltage of the power line 22 at the position ② also jumps downward due to the coupling effect, while the jump direction of the analog voltage AVDD of the analog voltage terminal 32 is opposite to the jump direction of the data voltage, and therefore, at the position ②, the analog voltage AVDD of the analog voltage terminal 32 jumps up.

Based on the above research, it has been found that one terminal of the first capacitor C1 may be electrically connected to the power terminal 31, and the other terminal of the first capacitor C1 may be electrically connected to the analog voltage terminal 32. Since the jump direction of the analog voltage AVDD of the analog voltage terminal 32 is opposite to the jump direction of the data voltages on the plurality of data lines 21, a variation of the power voltages on the power lines 22 caused by the jump of the analog voltage AVDD of the analog voltage terminal 32 may at least partially offset the variation of the power voltages on the power lines 22 caused by the data voltages on the data lines 21, which may be beneficial to improve the stability of the power voltages on the power lines 22. In addition, the other terminal of the first capacitor C1 is electrically connected to the analogue voltage terminal 32, so that it is not necessary to provide an extra voltage terminal to provide a jump voltage. As such, only one first capacitor C1 is required to be added to improve the stability of the power voltages on the power lines 22, the structure of which is relatively simple.

Figure 6:
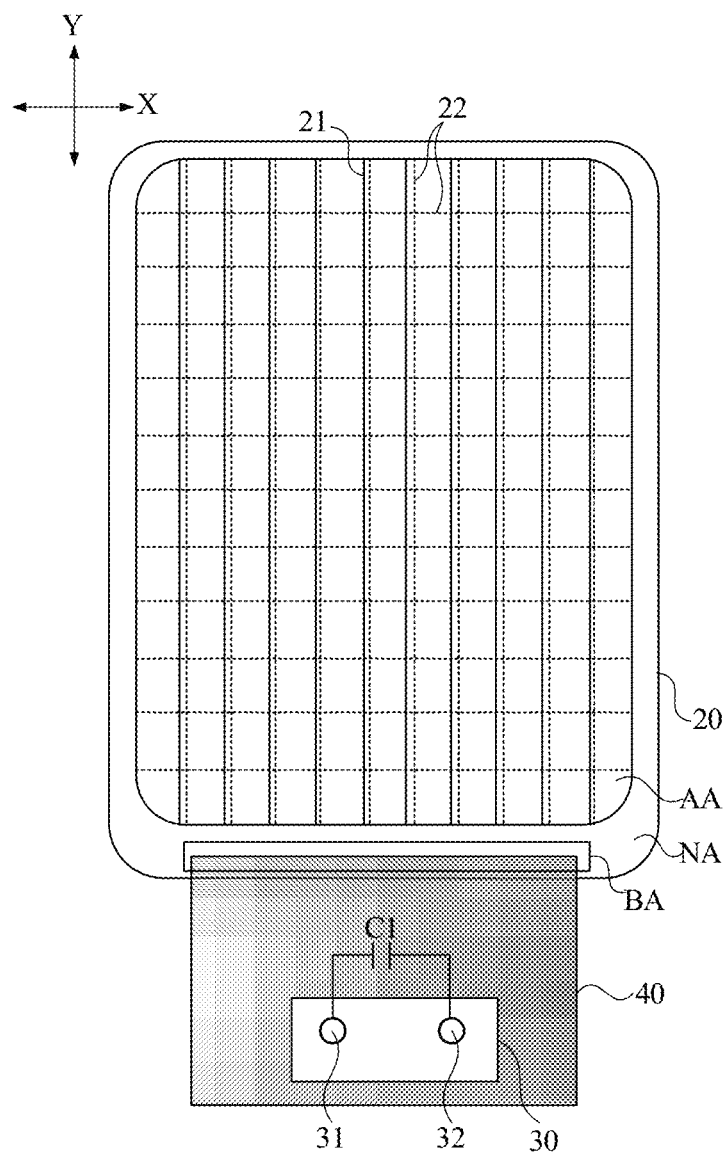
FIG. 6 shows another schematic structural diagram of a display module provided by an embodiment of the present application.

As shown in FIG. 6, the display panel 20 may include a display area AA and a non-display area NA at least partially surrounding the display area AA. The data lines 21 and the power lines 22 may be positioned in the display area AA. The non-display area NA may include a binding area BA. The display module 200 may also include a flexible circuit board (FPC) 40. The flexible circuit board 40 may be bonded with the binding area BA. The integrated circuit and the first capacitor C1 may both be positioned on the flexible circuit board 40. The integrated circuit 30 may be a driver chip. When referring to that the first capacitor C1 is positioned on the flexible circuit board 40, it may be understood as that the first capacitor C1 is formed on the flexible circuit board 40 and the first capacitor C1 does not belong to the integrated circuit 30.

In the embodiment of the present application, a structure of the integrated circuit 30 may not be changed, through providing the first capacitor C1 on the flexible circuit board 40.

As an example, the first capacitor C1 may be a chip capacitor.

Exemplarily, the binding area BA may include binding terminals (not shown), for example, the binding area BA may include a binding terminal for transmitting the power voltage(s) and a binding terminal for transmitting the data voltage(s). The binding terminal for transmitting the power voltage(s) may be connected to the power line(s) 22 in the display area, and the binding terminal for transmitting the data voltage(s) may be connected to the data line(s) 21 in the display area.

The flexible circuit board 40 is connected to each of the binding terminals. The flexible circuit board 40 can provides a connection path for transmitting signals between the bonding terminals and the integrated circuit 30. The power voltage provided by the power terminal 31 on the integrated circuit 30 may be transmitted to the binding terminal for transmitting the power voltage(s) via the flexible circuit board 40, and then to the power line(s) 22 via the binding terminal for transmitting the power voltage(s). The integrated circuit 30 may generate, based on the analog voltage of the analog voltage terminal 32, the data voltage, and then the generated data voltage may be transmitted to the binding terminal for transmitting the data voltage(s) via the flexible circuit board 40, and then to the data line(s) 21 via the binding terminal for transmitting the data voltage(s).

Optionally, after the flexible circuit board 40 is bonded with the binding area BA, a part of the flexible circuit board 40 that is not bonded with the binding area BA may be folded back to a non-light-emitting surface of the display panel 20, and the integrated circuit 30 may be positioned on the non-light-emitting surface of the display panel 20, which is beneficial to achieve a narrow frame design.

In some embodiments, the integrated circuit 30 may be a display driver integrated circuit (DDIC). The DDIC may convert data to be displayed into data voltages and transmit the data voltages to the data lines 21. In a situation where the integrated circuit 30 is the DDIC, the DDIC may provide a high-level power voltage PVDD for the display panel 20. Alternatively, the DDIC may provide a low-level power voltage PVEE for the display panel 20.

Figure 7:
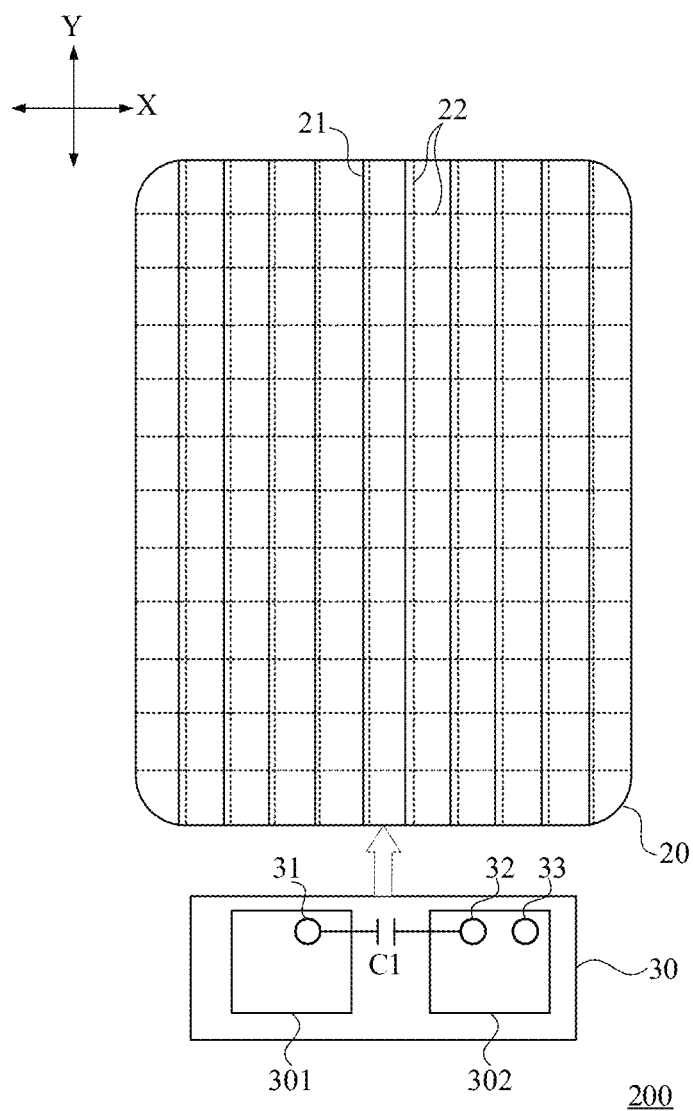
FIG. 7 shows another schematic structural diagram of a display module provided by an embodiment of the present application.

In other embodiments, as shown in FIG. 7, the integrated circuit 30 may include a first integrated circuit 301 and a second integrated circuit 302. The first integrated circuit 301 may be a power management interface controller (PARC), and the second integrated circuit 302 may be a DDIC. The first integrated circuit 301 may include the power terminal 31 and the second integrated circuit 302 may include the analog power terminal 32. The second integrated circuit 302 may further include a data voltage terminal 33.

The first integrated circuit 301 may be electrically connected to the display panel 20 and the second integrated circuit 302, and the first integrated circuit 301 may provide operating voltages for the display panel 20 and the second integrated circuit 302. For example, the first integrated circuit 301 may provide the high-level power voltage PVDD for the display panel 20 via the power terminal 31. The first integrated circuit 301 may alternatively provide the low-level power voltage PVEE for the display panel 20. The first integrated circuit 301 may provide a voltage for the analog power terminal 32 of the second integrated circuit 302.

Figure 8:
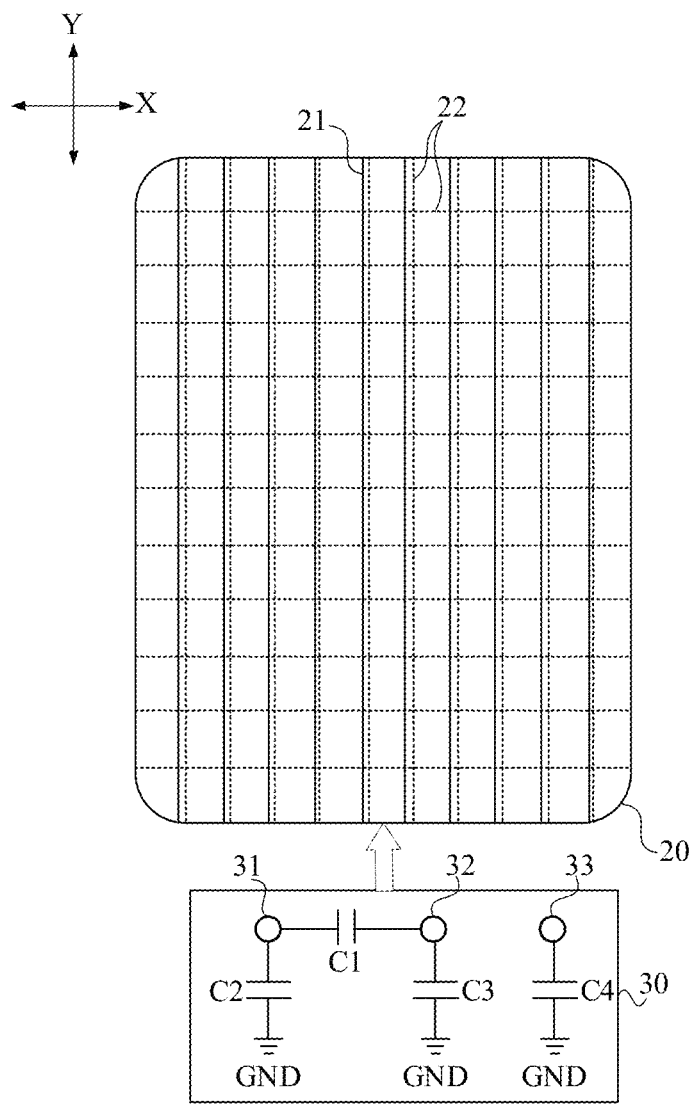
FIG. 8 shows another schematic structural diagram of a display module provided by an embodiment of the present application.

In some embodiments, as shown in FIG. 8, the display module 200 may further include a second capacitor C2. One terminal of the second capacitor C2 may be electrically connected to the power terminal 31, and the other terminal of the second capacitor C2 may be electrically connected to a ground terminal GND. It can be understood that, a voltage of the ground terminal GND is a fixed voltage, and therefore the second capacitor C2 may be understood as a voltage stabilizing capacitor, and the second capacitor C2 may be used for stabilizing a voltage of the power terminal 31.

A capacitance of the first capacitor C1 may be less than or equal to a capacitance of the second capacitor C2. The second capacitor C2 may be used for stabilizing the voltage of the power terminal 31, and the first capacitor C1 may be used for cause a variation of the voltage of the power terminal 31. In most situations, it is desirable to keep the voltage of the power terminal 31 relatively stable, and thus the capacitance of the second capacitor C2 is relatively great, so that the second capacitor C2 can have a strong stabilizing capacity for stabilizing the voltage of the power terminal 31.

In some embodiments, as shown in FIG. 8, the display module 200 may further include a third capacitor C3. One terminal of the third capacitor C3 may be electrically connected to the analog voltage terminal 32, and the other terminal of the third capacitor C3 may be electrically connected to a ground terminal GND. Similarly, a voltage of the ground terminal GND is a fixed voltage, and therefore the third capacitor C3 may be understood as a voltage stabilizing capacitor, and the third capacitor C3 may be used for stabilizing a voltage of the analogue voltage terminal 32.

The capacitance of the first capacitor C1 may be greater than or equal to a capacitance of the third capacitance C3. Through research, the inventor has found that, generally, the voltage of the analogue voltage terminal 32 is relatively stable, so that a required capacitance of the voltage stabilizing capacitor may be less, that is, the capacitance of the third capacitor C3 may be less. Since the voltage of the analog voltage terminal 32 has a small fluctuation, in a situation where the capacitance of the first capacitor C1 is relatively great, a coupling capacity of the first capacitor C1 is relatively strong. Even if the voltage of the analog voltage terminal 32 has a small fluctuation, a variation of the voltage of the power terminal 31 can be caused.

Exemplarily, as shown in FIG. 8, the display module 200 may further include a fourth capacitor C4. One terminal of the fourth capacitor C4 may be electrically connected to the data voltage terminal 33, and the other terminal of the fourth capacitor C4 may be electrically connected to a ground terminal GND. Similarly, a voltage of the ground terminal GND is a fixed voltage, and therefore the fourth capacitor C4 may be understood as a voltage stabilizing capacitor, and the fourth capacitor C4 may be used for stabilizing a voltage of the data voltage terminal 33.

The display panel may have different operating modes, for example, the operating modes of the display panel may include a first operating mode and a second operating mode. A capacitance of the first capacitor C1 is C11 under the first operating mode, a capacitance of the first capacitor C1 is C12 under the second operating mode, and C11≠C12. As such, the capacitance of the first capacitor C1 may be adjusted according to the operating modes of the display panel to adapt to different requirements flexibly.

It should be noted that, the embodiment of the present application has mentioned that the operating modes of the display panel include the first operating mode and the second operating mode, and the first operating mode and the second operating mode can represent different operating modes of the display panel rather than merely referring to two operating modes of the display panel. The operating modes of the display panel are different in different application scenes. For example, the display panel may require different power voltages under different operating modes, or the display panel may have different brightness under different operating modes.

As an example, a power voltage on the power lines 22 is PVDD1 under the first operating mode, a power voltage on the power lines 22 is PVDD2 under the second operating mode, and PVDD1≠PVDD2.

For example, one of the first operating mode and the second operating mode is a low power consumption operating mode, and the other one is a high power consumption operating mode.

For example, the higher the power voltage on the power lines 22 is, the greater the capacitance of the corresponding first capacitor C1 is. Alternatively, the higher the power voltage on the power lines 22 is, the less the capacitance of the corresponding first capacitor C1 is. The relationship between the magnitude of the power voltage on the power lines 22 and the magnitude of the capacitance of the first capacitor C1 may be set according to actual characteristics or actual requirements of the display panel, which is not limited herein.

Optionally, (PVDD1−PVDD2)*(C11−C12)>0. For example, PVDD1>PVDD2, and C11>C12. Alternatively, PVDD1<PVDD2, and C11<C12.

As another example, the display panel may have different brightness under different operating modes, and data voltages corresponding to the same gray scale may be different. When the display panel is displaying an image, the display panel can show different brightness according to environments in which the display panel is positioned. For example, a data voltage on the data lines 21 is Vdata1 at a target gray scale and under the first operating mode, a data voltage on the data lines 21 is Vdata2 at the target gray scale and under the second operating mode, and Vdata1≠Vdata2.

A data voltage corresponding to a 0 gray scale of the display panel is the black-state voltage. The black-state voltage may be the same under different operating modes. The target gray scale may be any gray scale other than the 0 gray scale, for example, the display panel may display gray scales ranging from 0 to 255, and the target gray scale may be any gray scale from 1 to 255.

In an example where the target gray scale is the 127 gray scale, a data voltage corresponding to the 127 gray scale under the first operating mode is different from a data voltage corresponding to the 127 gray scale under the second operating mode. Jump variations of the data voltage corresponding to the 127 gray scale to the data voltage corresponding to the gray scale are different under the first operating mode and the second operating mode. Therefore, the capacitances of the first capacitor C1 under the two operating modes may be set to be different to adapt to different jump variations of the data voltages.

For example, Vdata1>Vdata2, and C11>C12. Alternatively, Vdata1<Vdata2, C11<C12. The relationship between the magnitude of the data voltage on the data lines 21 and the magnitude of the capacitance of the first capacitor C1 under different operating modes may be set according to the actual characteristics or actual requirements of the display panel, which is not limited herein.

Figure 9:
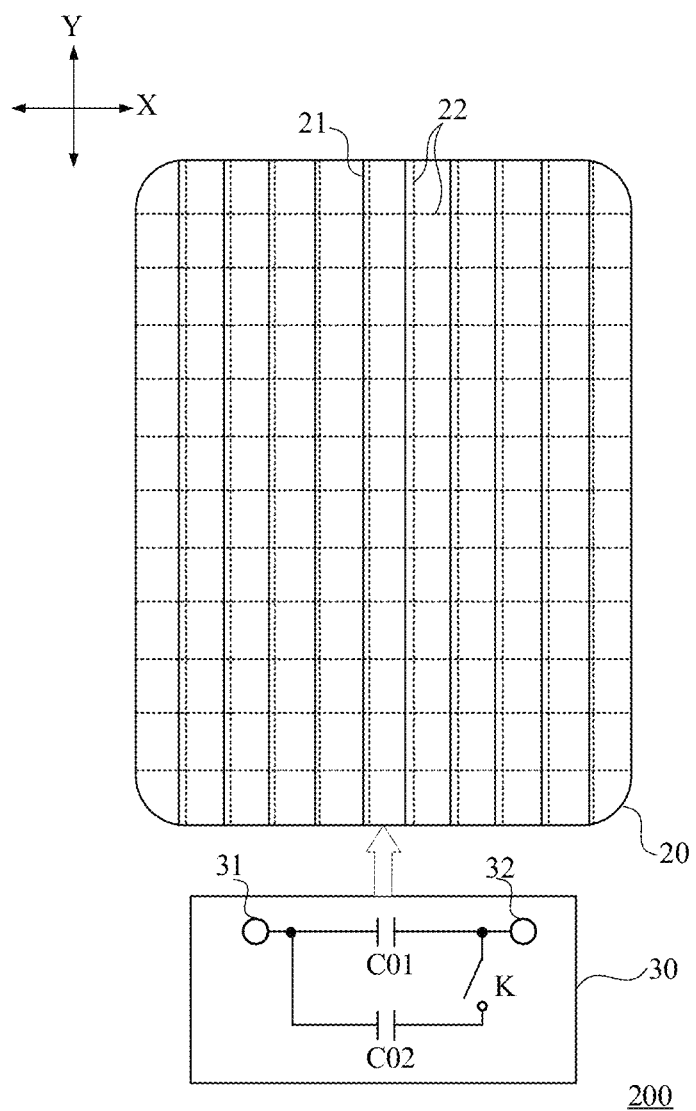
FIG. 9 shows another schematic structural diagram of a display module provided by an embodiment of the present application.

In some embodiments, as shown in FIG. 9, the first capacitor C1 may include at least two sub-capacitors connected in parallel, and at least one of the sub-capacitors may be connected in series with a switch element K. For example, the first capacitor C1 may include a first sub-capacitor C01 and a second sub-capacitor C02 connected in parallel, and the second sub-capacitor C02 may be connected in series with the switch element K. The switch element K may be controlled to be turned on in a situation where a great capacitance is required; and the switch element K may be controlled to be turned off in a situation where a small capacitance is required.

Figure 10:
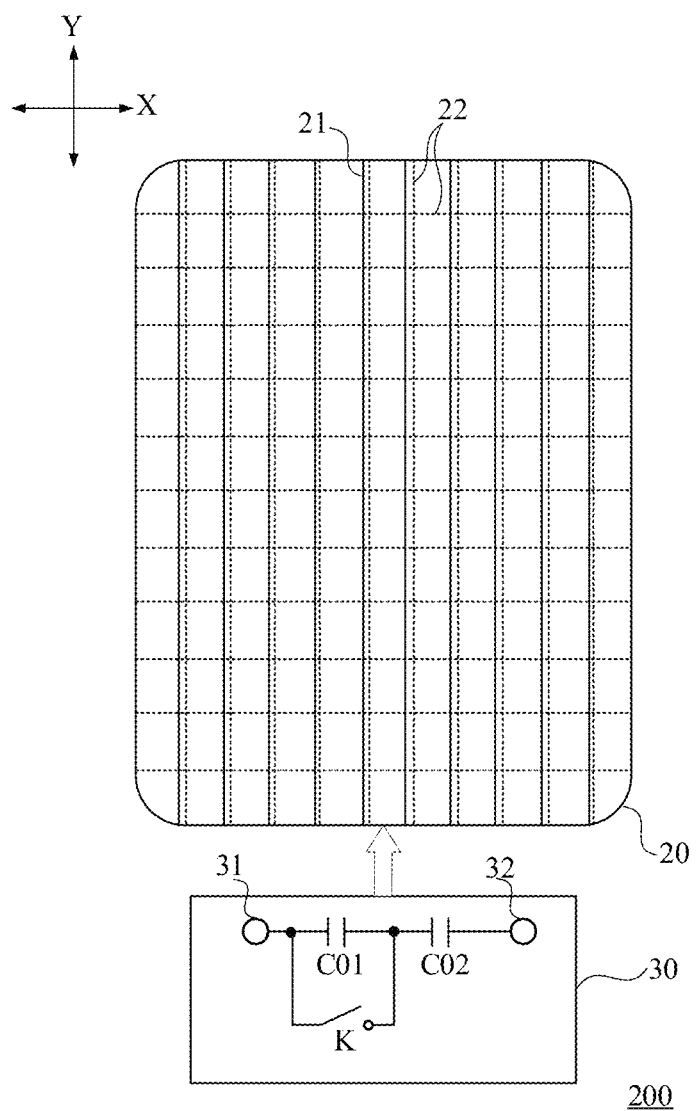
FIG. 10 shows another schematic structural diagram of a display module provided by an embodiment of the present application.

In some embodiments, as shown in FIG. 10, the first capacitor C1 may include at least two sub-capacitors connected in series, and at least one of the sub-capacitors may be connected in parallel with a switch element K. For example, the first capacitor C1 may include a first sub-capacitor C01 and a second sub-capacitor C02 connected in series, the first sub-capacitor C01 may be connected in parallel with the switch element K. The switch element K may be controlled to be turned on in a situation where a great capacitance is required; and the switch element K may be controlled to be turned off in a situation where a small capacitance is required.

The switch element K may be a transistor or may be another type of switch device.

Figure 11:
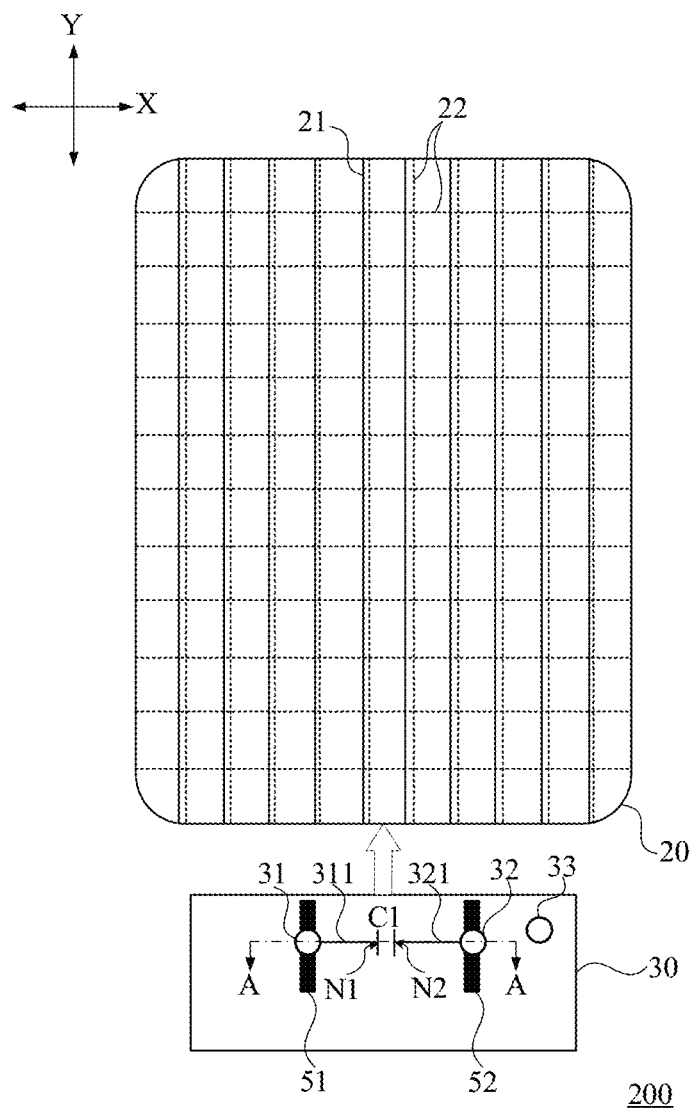
FIG. 11 shows another schematic structural diagram of a display module provided by an embodiment of the present application.

In some examples, as shown in FIG. 11, the power terminal 31 may be connected with a first connecting line 51, and the analog voltage terminal 32 may be connected with a second connecting line 52. The first connecting line 51 may transmit a signal from the power terminal 31, for example, the first connecting line 51 may transmit a power voltage provided by the power terminal 31 to the display area of the display panel. The second connecting line 52 may transmit a signal from the analog voltage terminal 32, for example, the second connecting line 52 may transmit the signal from the analog voltage terminal 32 to a data voltage generating circuit, for using by the data voltage generating circuit to generate a data signal.

The first connecting line 51 and the second connecting line 52 may both extend along a first direction, the first capacitor C1 may extend along a second direction, and the first direction intersects the second direction. For example, the first capacitor C1 contacts a connecting line 311 from the power terminal 31 at a contact point N1, and contacts a connecting line 321 from the analogue voltage terminal 32 at a contact point N2, and an extending direction of the first capacitor C1 may be understood as an extending direction of a connecting line passing through the contact point N1 and the contact point N2.

Figure 12:
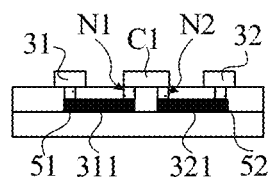
FIG. 12 shows a schematic structural diagram of a sectional view along a line A-A in FIG. 11.

As an example, as shown in FIG. 12, the first connecting line 51, the second connecting line 52, the connecting line 311 between the first capacitor C1 and the power terminal 31, and the connecting line 321 between the first capacitor C1 and the analog voltage terminal 32 may be positioned in the same film layer.

Based on the same inventive concept, an embodiment of the present application further provides an integrated circuit. The integrated circuit is configured to provide signals for the display panel. As shown in FIG. 4, the display panel includes the data lines 21 and the power lines 22, the integrated circuit 30 includes the first capacitor C1, the first capacitor C1 is electrically connected to one or more of the power lines 22, and a variation of a power voltage on each of the one of more power lines 22 caused by the first capacitor C1 at least partially offsets a variation of the power voltage on the power line 22 caused by a data voltage on a corresponding one of the data lines 21.

In the embodiment of the present application, the first capacitor C1 is provided, which causes the variation of the power voltage on each of the power lines 22 to at least partially offset the variation of the power voltage on the power line 22 caused by the data voltage on the corresponding one of the data lines 21, for example, a jump direction of the power voltage on the power line 22 caused by the first capacitor C1 may be opposite to a jump direction of the power voltage on the power line 22 caused by the data voltage on the corresponding one of the data lines 21, so that it is beneficial to improve the stability of the power voltage on the power line 22, and thereby mitigate a problem that a bright line or a dark line appears at an intersection of a dark state image and a bright state image of the display panel, so as to improve the display effect and the user experience.

In the present application, the integrated circuit may particularly be an integrated chip.

As shown in FIG. 4, the integrated circuit 30 may include the power terminal 31, the analog voltage terminal 32 and the data voltage terminal 33. The data voltage terminal 33 may be electrically connected to the data lines 21, and the data voltage terminal 33 may be electrically connected to the analog voltage terminal 32. The integrated circuit 30 may generate, based on the analog voltage AVDD of the analog voltage terminal 32, the data voltage Vdata required by the display panel 20 for displaying, and the data voltage Vdata generated by the integrated circuit 30 may be transmitted to the data lines 21 of the display panel 20 via the data voltage terminal 33, and then may be transmitted to the pixel circuits of the display panel 20 via the data lines 21.

The power terminal 31 may be electrically connected to the power lines 22, the power terminal 31 may be configured to provide the power voltage PVDD, and the power voltage PVDD provided by the power terminal 31 may be transmitted to the power lines 22.

One terminal of the first capacitor C1 may be electrically connected to the power terminal 31, and the other terminal of the first capacitor C1 may be electrically connected to the analogue voltage terminal 32. Since the jump direction of the analog voltage AVDD of the analog voltage terminal 32 is opposite to the jump direction of the data voltages on the plurality of data lines 21, the variation of the power voltage on the power lines 22 caused by the jump of the analog voltage AVDD of the analog voltage terminal 32 may at least partially offset the variation of the power voltages on the power lines 22 caused by the data voltage on the data lines 21, which may be beneficial to improve the stability of the power voltage on the power lines 22. In addition, the other terminal of the first capacitor C1 is electrically connected to the analogue voltage terminal 32, so that it is not necessary to provide an extra voltage terminal to provide a jump voltage. As such, only one first capacitor C1 is required to be added to improve the stability of the power voltage on the power lines 22, the structure of which is relatively simple.

As shown in FIG. 7, the integrated circuit 30 may include the first integrated circuit 301 and the second integrated circuit 302. The first integrated circuit 301 may be the PMIC, and the second integrated circuit 302 may be the DDIC. The first integrated circuit 301 may include the power terminal 31, and the second integrated circuit 302 may include the analog power terminal 32 and the data voltage terminal 33. The first capacitor C1 may be included in either of the first integrated circuit 301 and the second integrated circuit 302.

Figure 13:
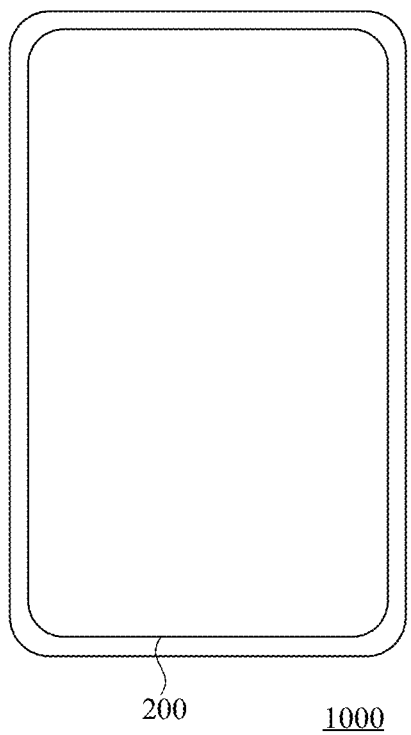
FIG. 13 shows a schematic structural diagram of a display apparatus provided by an embodiment of the present application.

Based on the same inventive concept, the present application further provides a display apparatus including the display panel provided by the present application. With reference to FIG. 13, FIG. 13 is a schematic structural diagram of a display apparatus provided by an embodiment of the present application. The display apparatus 1000 provided by FIG. 13 includes the display module 200 according to any of the above embodiments of the present application. In the embodiment of FIG. 13, a mobile phone is described only as an example to illustrate the display apparatus 1000, and it can be understood that the display apparatus provided by the embodiment of the present application may be a wearable product, a computer, a television, a vehicle-mounted display apparatus and another display apparatus capable of displaying, which is not limited herein. The display apparatus provided by the embodiment of the present application is benefit from the beneficial effects of the display modules provided by the embodiments of the present application. The beneficial effects have been detailed in the specific description of the display modules according to the above embodiments, which will not repeated herein in this embodiment.

According to the embodiments of present application as described above, these embodiments do not exhaustively describe all the details and do not limit the present application only to be the specific embodiments. Obviously, many modifications and variations can be made according to the above description. These embodiments are selected and particularly described in the specification to better explain the principles and practical applications of the present application, so that a person skilled in the art is able to utilize the present application and make modifications based on the present application. The present application is limited only by the claims and the full scope and equivalents of the claims.

What is claimed is:

1. A display module, comprising:
  a display panel comprising data lines and power lines; and
  a first capacitor electrically connected to one or more of the power lines, wherein the first capacitor is configured to at least partially offset a variation of a power voltage on each of the one of more power lines caused by a data voltage on a corresponding one of the data lines, wherein the display module further comprises an integrated circuit comprising a power terminal, the power terminal is electrically connected to the one of more power lines, and the first capacitor is electrically connected to the one of more power lines through the power terminal, wherein the integrated circuit further comprises an analog voltage terminal, one terminal of the first capacitor is electrically connected to the power terminal, and the other terminal of the first capacitor is electrically connected to the analog voltage terminal, and wherein the power terminal is connected to a first connecting line, the analog voltage terminal is connected to a second connecting line, the first connecting line and the second connecting line extend along a first direction, and the first capacitor extends along a second direction, and the first direction intersects the second direction.

2. The display module according to claim 1, wherein the display module further comprises a flexible circuit board, and the integrated circuit and the first capacitor are positioned on the flexible circuit board.

3. The display module according to claim 1, wherein the integrated circuit comprises a display driver integrated circuit.

4. The display module according to claim 1, wherein the integrated circuit comprises a first integrated circuit comprising a power management interface controller and a second integrated circuit comprising a display driver integrated circuit;

the first integrated circuit comprises the power terminal, and the second integrated circuit comprises the analog voltage terminal.

5. The display module according to claim 1, wherein the display module further comprises a third capacitor, one terminal of the third capacitor is electrically connected to the analog voltage terminal, and the other terminal of the second capacitor is electrically connected to a ground terminal, and a capacitance of the first capacitor is greater than or equal to a capacitance of the third capacitor.

6. The display module according to claim 1, wherein the first capacitor is a chip capacitor.

7. The display module according to claim 1, wherein an operating mode of the display panel comprises a first operating mode and a second operating mode;

a capacitance of the first capacitor is C11 under the first operating mode, a capacitance of the first capacitor is C12 under the second operating mode, and C11≠C12.

8. The display module according to claim 7, wherein a power voltage on the power lines is PVDD1 under the first operating mode, a power voltage on the power lines is PVDD2 under the second operating mode, and PVDD1≠PVDD2.

9. The display module according to claim 8, wherein (PVDD1−PVDD2)*(C11−C12)>0.

10. The display module according to claim 7, wherein a data voltage on the data lines is Vdata1 at a target gray scale and under the first operating mode, a data voltage on the data lines is Vdata2 at the target gray scale and under the second operating mode, and Vdata1≠Vdata2.

11. The display module according to claim 7, wherein the first capacitor comprises at least two sub-capacitors connected in parallel, and at least one of the sub-capacitors is connected in series with a switch element.

12. The display module according to claim 7, wherein the first capacitor comprises at least two sub-capacitors connected in series, and at least one of the sub-capacitors is connected in parallel with a switch element.

13. A display apparatus, comprising the display module of claim 1.

14. A display module, comprising:
a display panel comprising data lines and power lines; and
a first capacitor electrically connected to one or more of the power lines, wherein the first capacitor is configured to at least partially offset a variation of a power voltage on each of the one of more power lines caused by a data voltage on a corresponding one of the data lines, wherein the display module further comprises an integrated circuit comprising a power terminal, the power terminal is electrically connected to the one of more power lines, and the first capacitor is electrically connected to the one of more power lines through the power terminal, and wherein the display module further comprises a second capacitor, one terminal of the second capacitor is electrically connected to the power terminal, the other terminal of the second capacitor is electrically connected to a ground terminal, and a capacitance of the first capacitor is less than or equal to a capacitance of the second capacitor.

15. An integrated circuit configured to provide a signal for a display panel comprising data lines and power lines, wherein the integrated circuit comprises a first capacitor electrically connected to one or more of the power lines, and the first capacitor is configured to at least partially offset a variation of a power voltage on each of the one of more power lines caused by a data voltage on a corresponding one of the data lines, wherein the integrated circuit comprises a power terminal, an analog voltage terminal and a data voltage terminal, the data voltage terminal is electrically connected to the data lines, and the data voltage terminal is electrically connected to the analog voltage terminal, the power terminal is electrically connected to the power lines, one terminal of the first capacitor is electrically connected to the power terminal, and the other terminal of the first capacitor is electrically connected to the analog voltage terminal, and wherein the integrated circuit comprises a first integrated circuit and a second integrated circuit, the first integrated circuit comprises the power terminal, and the second integrated circuit comprises the analog voltage terminal and the data voltage terminal; and the first capacitor is comprised in either of the first integrated circuit and the second integrated circuit.

* * * * *